Oct. 4, 1927.

J. BORER 1,644,631

APPARATUS FOR THE MANUFACTURE OF MICA PLATES

Filed April 19, 1926.  2 Sheets-Sheet 1

Inventor
J. Borer
by Langner, ...
Attys.

Oct. 4, 1927.　　　　　　　　　　　　　　　　　　　1,644,631
J. BORER
APPARATUS FOR THE MANUFACTURE OF MICA PLATES
Filed April 19, 1926　　　　2 Sheets-Sheet 2

Fig. 3.

Inventor:
J. Borer

Patented Oct. 4, 1927.

1,644,631

UNITED STATES PATENT OFFICE.

JOSEF BORER, OF BREITENBACH, NEAR BASEL, SWITZERLAND.

APPARATUS FOR THE MANUFACTURE OF MICA PLATES.

Application filed April 19, 1926. Serial No. 103,145.

This invention relates to apparatus for the manufacture of plates from mica flakes by sucking them on to a perforated plate and then releasing the mica layer therefrom.

This apparatus is characterized by the suction trunk combined with the suction plate being so divided by partitions into individual suction compartments or suction channels, that the suction action is uniformly distributed over the whole area of the suction plate. In this way the advantage is obtained of a uniform layer of mica on the suction plate, since all parts thereof are submitted to approximately the same suction action.

Figure 1:
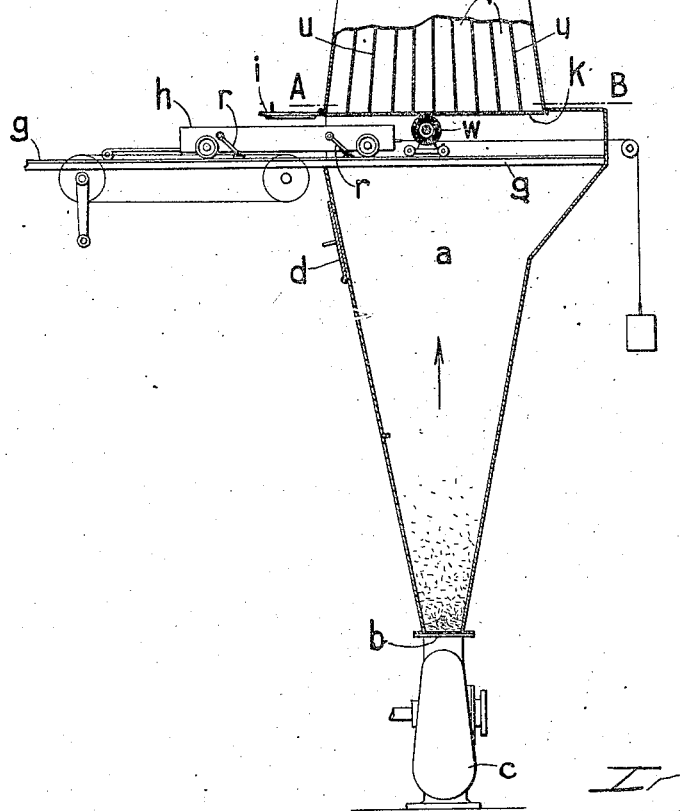
Figure 2:
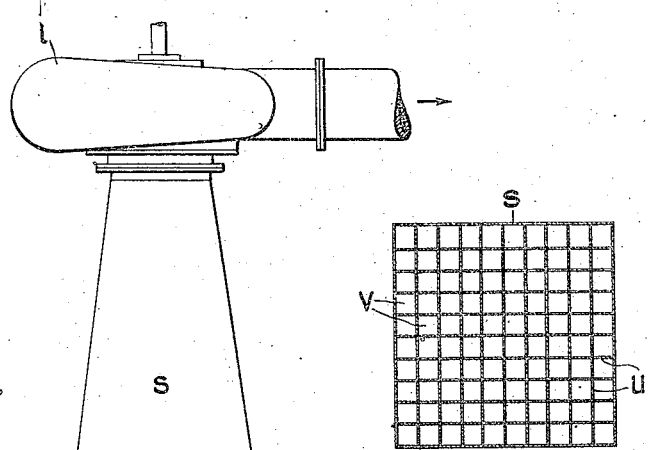

An embodiment of the apparatus is illustrated in the accompanying drawings, in which:

Fig. 1 is a vertical section thereof, and
Fig. 2 a partial horizontal section on line A—B of Fig. 1.
Fig. 3 shows a detail on a larger scale.

The trunk $a$ broadening at the top to suit the form of the plate is connected at the lower end with a pressure air blower $c$. Above this is a sieve $b$ on which the mica flakes rest when the blower is at rest. In the upper part of the trunk $a$ is a perforated suction plate $k$. A door $d$ below this serves for charging the trunk $a$.

In the upper part of the trunk $a$, below the suction plate $k$, a take-off plate $h$ is movably arranged on two rails $g$. The run-in plate $h$ can be lifted up against the perforated suction plate $k$ by suitable swinging levers $r$. The plate $h$ serves to take off the layer of mica adhering to the suction plate $k$ and remove it for further treatment. The opening in the trunk through which the take-off plate $h$ passes, can be closed by a valve $i$.

Above the suction plate $k$ rises a suction trunk $s$ at the upper end of which is located a suction fan $t$. The suction trunk $s$ is divided into compartments by division walls or partitions $u$, as can be seen in Fig. 2, so that a series of adjacent suction channels $v$ are formed, by which means the suction action is uniformly distributed over the suction plate $k$.

The manufacture of plates from mica with this apparatus proceeds as follows:

The devices $c$ and $t$ are set in action and approximately the necessary quantity of mica for one suction thrown into the trunk $a$. The mica flakes are raised, whirled and separated by the pressure air in the lower part of the trunk $a$ and are brought into the reach of the suction air, and drawn thereby against the perforated suction plate $k$.

After a sufficient quantity of mica flakes adheres to the lower side of the suction plate $k$, the pressure air is stopped, the take-off plate $h$ is run into the trunk and pressed against the plate $k$ with the mica layer adhering to it. The suction air is cut off and the take-off plate lowered. It takes with it the mica flakes on the plate $k$, and they remain lying on the plate $h$. The mica flakes are then sprayed with adhesive in the known manner.

During the running out of the take-off plate $h$ a roller brush $w$ connected therewith brushes the lower side of the suction plate $k$, thus cleaning it and leaving it clear for the next operation. When the take-off plate $h$ is moved out of the trunk $a$, the carrier $w^1$ (Fig. 3) carrying the brush $w$ strikes finally against a fixed stop $x$, so that on continuation of said outward movement, a gripping coupling $y$ between the carrier $w^1$ and the take-off plate $h$ is disengaged to allow the carrier $w^1$ with the brush to run backward to the right positon under the action of a weight $z$ connected by a cable to said carrier. When the take-off plate $h$ is reintroduced into the trunk $a$, the said coupling $y$ becomes closed again for subsequent trailing of the brush.

What I claim is:—

1. An apparatus for the manufacture of mica plates, comprising in combination a mica supplied trunk, means at its lower end to keep mica flakes in suspension therein, a perforated suction plate at the top of said trunk, a suction trunk arranged above said suction plate, partitions within said suction trunk to subdivide it into a number of adjacent suction channels uniformly distributed over the suction plate, a suction device mounted at the upper end of the suction trunk, and a movable take-off plate capable of being shifted below the suction plate and pressed against it to take the mica layer therefrom.

2. An apparatus for the manufacture of mica plates, comprising in combination a mica supplied trunk, means at its lower end to keep mica flakes in suspension therein, a perforated suction plate at the top of said trunk, a suction trunk arranged above said suction plate, partitions within said suction trunk to subdivide it into a number of adjacent suction channels uniformly distributed over the suction plate, a suction fan mounted at the upper end of the suction trunk, and a movable take-off plate capable of being shifted below the suction plate and pressed against it to take off the mica layer therefrom, a cleaner being connected to said movable take-off plate to clean the suction side of the suction plate.

In witness whereof I have hereunto signed my name this 8th day of April 1926.

JOSEF BORER.